PHEBE D. DAMON.
VEGETABLE-STEAMER.

No. 169,779. Patented Nov. 9, 1875.

WITNESSES.
A. Gilman
Jasper L. Jewell

INVENTOR
Phebe D. Damon
J. C. Lathrop
Atty.

UNITED STATES PATENT OFFICE.

PHEBE D. DAMON, OF FAYETTEVILLE, NEW YORK.

IMPROVEMENT IN VEGETABLE-STEAMERS.

Specification forming part of Letters Patent No. 169,779, dated November 9, 1875; application filed April 16, 1875.

*To all whom it may concern:*

Be it known that I, PHEBE D. DAMON, of Fayetteville, in the county of Onondaga and State of New York, have invented certain new and useful Improvements in Vegetable-Steamers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The nature of my invention consists in the construction and arrangement of a vegetable-steamer for steaming several kinds of food at the same time, as will be hereinafter more fully set forth.

Figure 1:
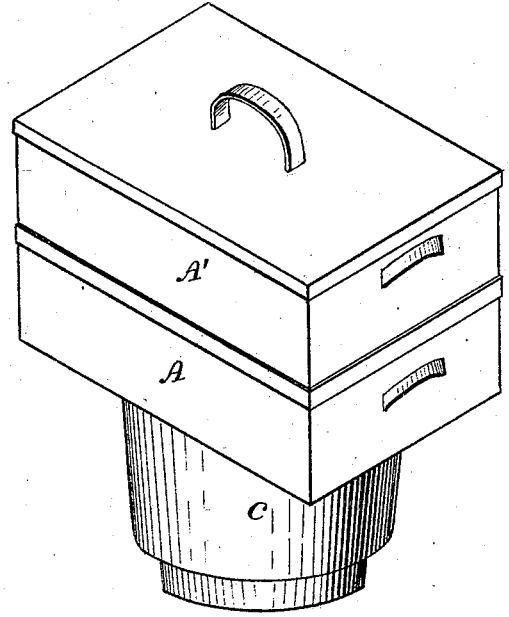
Figure 2:
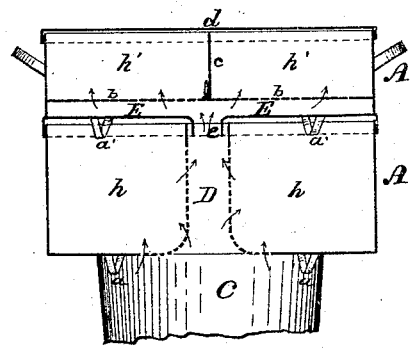

In the annexed drawing, Figure 1 is a perspective view of my steamer, and Fig. 2 is a transverse vertical section of the same.

C represents an ordinary kettle or other vessel for containing water to generate steam, the steamer being placed thereon. The steamer consists of two pans, A A', placed one upon the other, and fitting tight, the upper pan A' being provided with a lid, $d$. The lower pan A is divided into two chambers, $h\ h$, with a passage, D, between them. The inner sides and part of bottoms of the chambers $h\ h$ are perforated, as shown, to admit steam therein.

The bottom E of the upper pan A' has its bottom divided to form the center opening $e$, and bent downward to enter the passage D of the lower pan. Inside of the upper pan, a suitable distance above the bottom E, is a false perforated bottom, $b$, and a transverse vertical partition, $c$, dividing said pan also into two chambers, $h'\ h'$. The pans are on their under sides provided, respectively, with lugs $a$ and $a'$, to hold them in place. In this steamer are thus formed four chambers for steaming four different articles of food at the same time. The upper part A' may be used alone, if so desired.

Having thus fully described my invention, what I claim as new, and desire to secure by Letters Patent, is—

The combination, in a vegetable-steamer, of the pan A, provided with chambers $h\ h$ and passage D, with the vessel A', having its bottom divided to form the central opening $e$, and provided with the false bottom $b$, partition $c$, and lid $d$, substantially as and for the purposes set forth.

In testimony that I claim the foregoing as my own I herewith affix my signature in presence of two witnesses.

PHEBE D. DAMON.

Witnesses:
FRANCIS JEWELL,
JASPER L. JEWELL.